(No Model.) 3 Sheets—Sheet 1.

G. E. SPARKS.
FERTILIZER DISTRIBUTER.

No. 468,837. Patented Feb. 16, 1892.

Witnesses:
A. F. Langdon.
A. B. Jenkins.

Inventor,
George E. Sparks, by
Harry R. Williams
att.

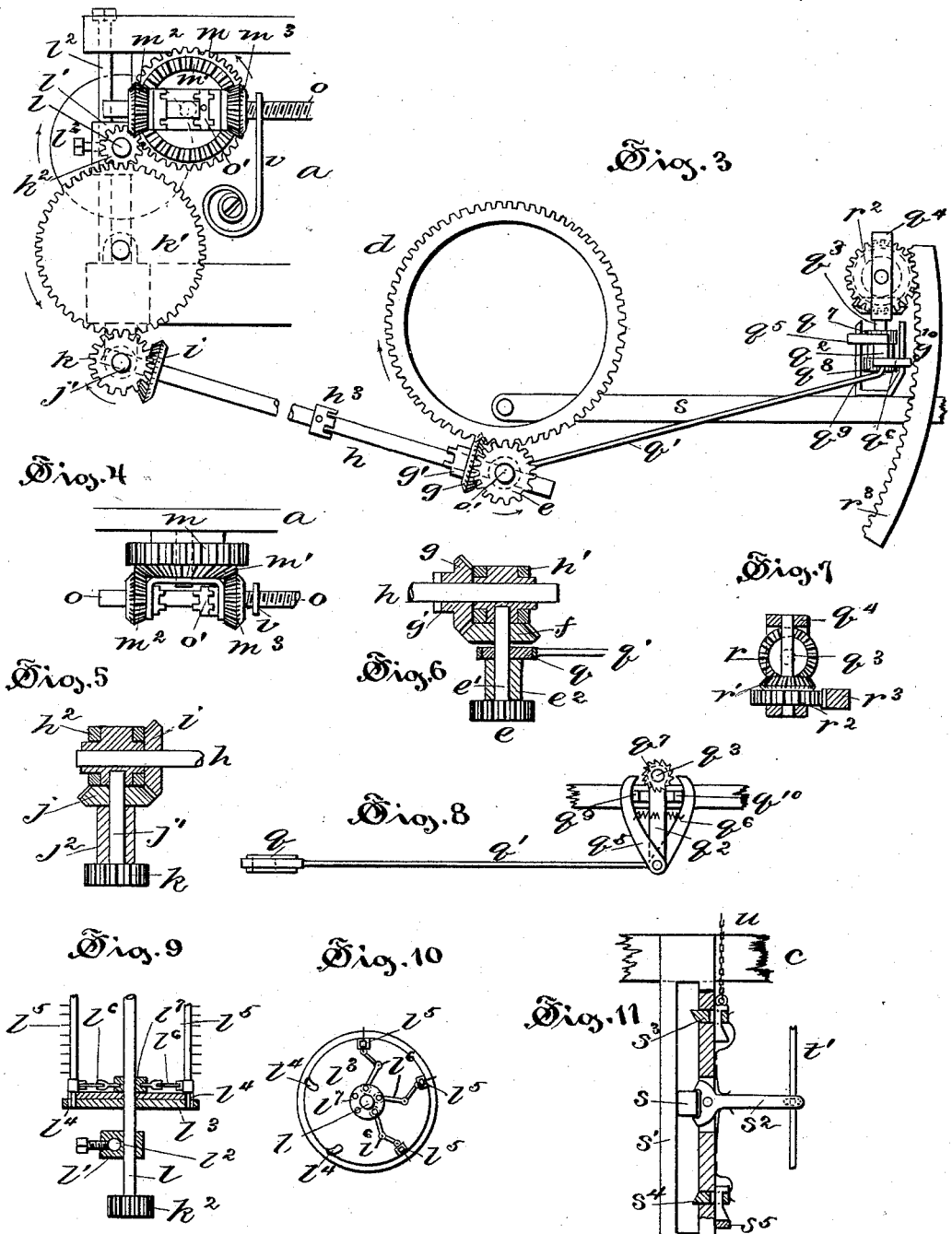

(No Model.) 3 Sheets—Sheet 3.
G. E. SPARKS.
FERTILIZER DISTRIBUTER.
No. 468,837. Patented Feb. 16, 1892.
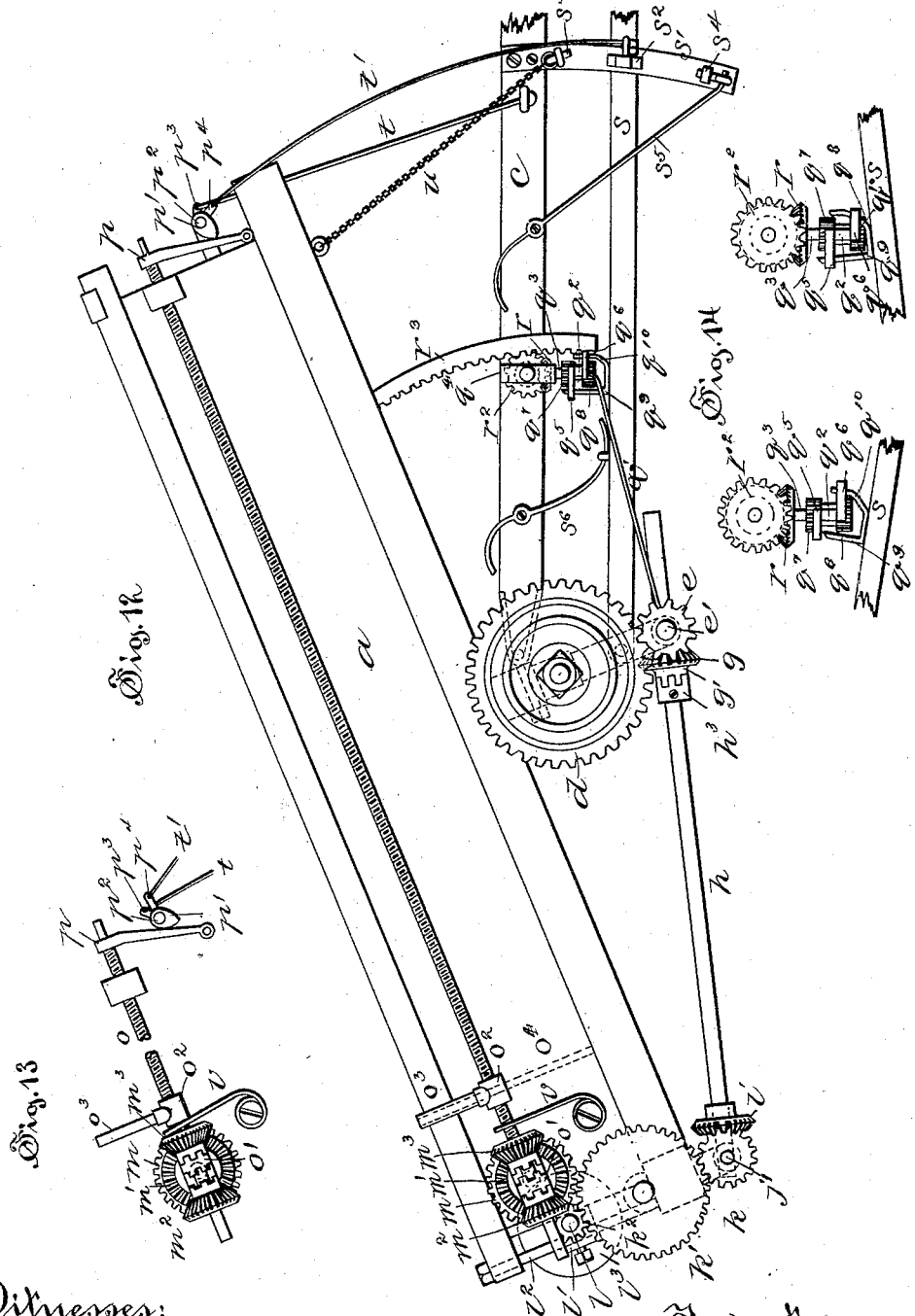
Witnesses:
Albert H. Walker
Phoebe A. Phelps
Inventor,
George E. Sparks, by
Harry R. Williams
Atty.

UNITED STATES PATENT OFFICE.

GEORGE E. SPARKS, OF VERNON, CONNECTICUT.

FERTILIZER-DISTRIBUTER.

SPECIFICATION forming part of Letters Patent No. 468,837, dated February 16, 1892.

Application filed October 20, 1890. Serial No. 368,675. (No model.)

*To all whom it may concern:*

Be it known that I, GEORGE E. SPARKS, a citizen of the United States, residing at Vernon, in the county of Tolland and State of Connecticut, have invented certain new and useful Improvements in Fertilizer-Distributers, of which the following is a full, clear, and exact specification.

The invention relates to the class of fertilizer-distributers more especially adapted and intended to spread animal manure from the compost heap with which more or less straw or hay is mixed; and the object of the invention is to provide simple mechanism that can be applied to any form of tip or dump cart or wagon, so that the rotation of the wheels automatically tips the cart, feeds the manure to a distributing-drum, and lowers the cart when the supply of manure is exhausted.

To this end the invention consists in a tipping device adapted to raise and lower the cart according to the position of a starting-lever, a spreading-drum adapted to spread the manure when the cart is tipped, and a feeding device adapted to feed the manure to the spreading-drum when the latter is in operation, as more particularly hereinafter described, and pointed out in the claims.

Figure 1:
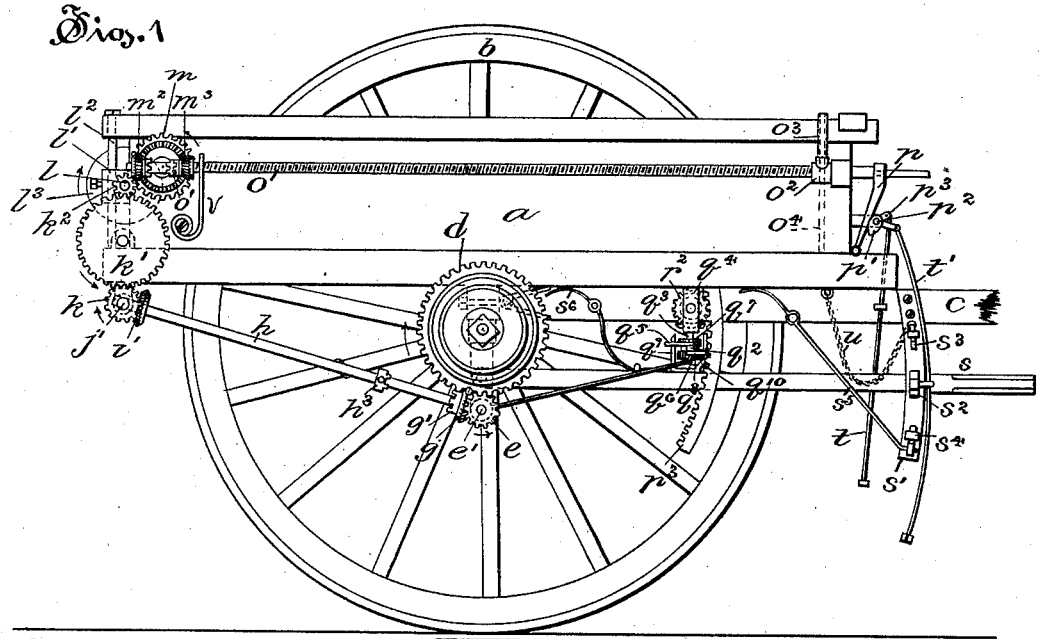
Figure 2:
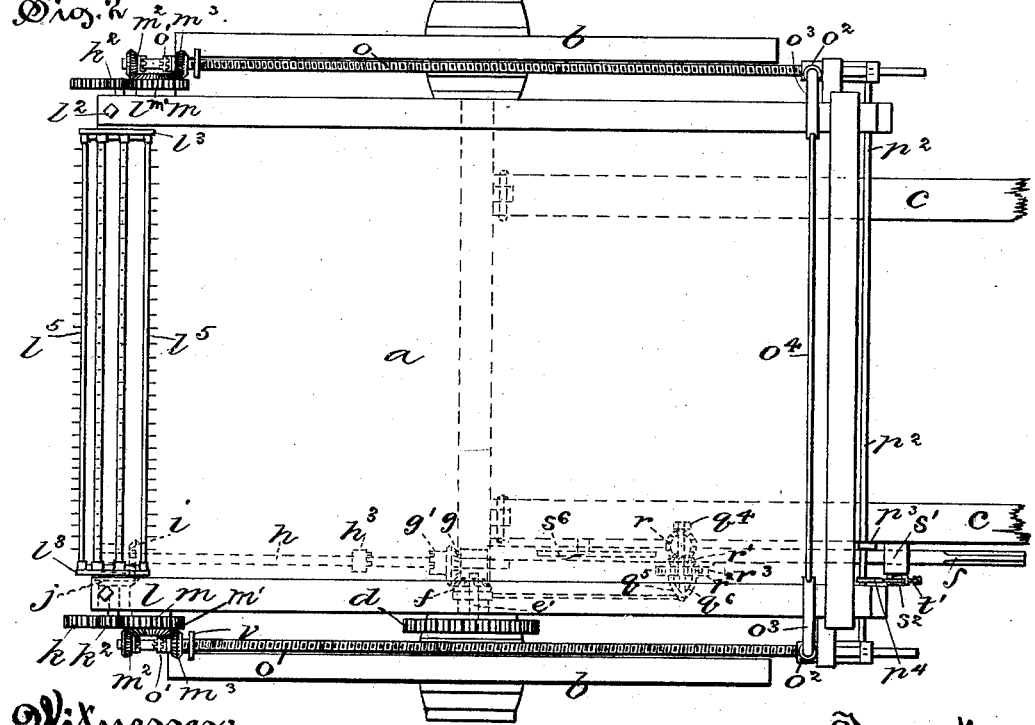

Referring to the accompanying drawings, Figure 1 is a side elevation of a cart, with one of the wheels removed, provided with my invention. Fig. 2 is a plan view of the cart. Fig. 3 is an enlarged detail side elevation of the tipping-drum operating and feeding mechanism. Fig. 4 is a detail top view of the feed-screw-operating mechanism. Fig. 5 is a detail horizontal section of the connection between the driving-shaft and the spreading-drum-operating pinion. Fig. 6 is a detail horizontal section of the connection between the driving-shaft and the pinion which meshes with the driving-gear. Fig. 7 is a detail plan, with part in section, of the tipping-rack and pinion. Fig. 8 is a detail plan of the tipping mechanism. Fig. 9 is a detail horizontal section of a portion of the spreading-drum. Fig. 10 is a detail side elevation of the inside end of the spreading-drum. Fig. 11 is a detail edge elevation, with part in section, of the handle-lever and holding-rack. Fig. 12 is a side view showing the body of the cart tipped as in discharging its load with the several parts in their relative positions. Fig. 13 is a detail side view of the ends of the feed-screw for discharging the load with its connections. Fig. 14 are detail views illustrating the positions of the handle-lever when in position so that the cart is raised and lowered.

In the views, the letter $a$ indicates the body of a cart, which is secured to an axle that is supported by wheels $b$ and provided with the usual hinged thills or shafts $c$, as is common in this form of vehicles. A gear $d$, which is mounted upon and rotates with one of the wheels $b$, meshes with a pinion $e$, attached to a short shaft $e'$, supported parallel with the axle by suitable bearings $e^2$. To this shaft $e'$ is attached a bevel-gear $f$, that meshes with a bevel-gear $g$, loosely mounted upon a shaft $h$, supported at one end in an oscillating bearing $h'$, depending from the axle, and at the other end in an oscillating bearing $h^2$, that depends from the rear end of the cart. A clutch $h^3$ is secured to this shaft $h$ at such a distance from the clutch $g'$ on the hub of the gear $g$ that when the cart is tipped to the desired inclination the clutches engage with each other. Upon the rear end of this shaft $h$, near the bearing $h^2$, is secured a bevel-gear $i$, that meshes with a bevel-gear $j$, secured to a shaft $j'$, supported in bearings $j^2$, depending from the body of the cart. This short shaft $j'$ also bears a pinion $k$, that meshes with an idle-gear $k'$ in mesh with a pinion $k^2$, secured to the outer end of a shaft $l$, supported in bearings formed in blocks $l'$, secured to the vertical rods $l^2$ at the rear of the cart. The shaft $l$ extends transversely across the rear of the cart and bears at each end disks $l^3$ in slots $l^4$, in or near the edge of which are loosely held the ends of the ribs $l^5$, that extend from disk to disk across the cart, and are provided with fingers for grasping manure as it is fed to the drum. As is shown in Figs. 9 and 10, these ribs, which are loosely supported at each end by the disks, are connected at each end by articulated arms $l^6$ with collars $l^7$, secured to the shaft, so that when during the rotation of the reel the fingers come in contact with the manure the resistance offered causes the articulated arms to slightly buckle and the fingers to turn a little, so as to more firmly grasp the manure, and after the resistance is removed the fingers straighten out and allow the manure to drop off.

Upon the face of a gear $m$, that also meshes with the pinion $k^2$, is a bevel-gear $m'$, in mesh with bevel-gears $m^2\ m^3$, mounted loosely upon the end of the screw-shafts $o$. The hub of each of these gears $m^2\ m^3$ is provided with a clutch that is adapted to grasp the clutch $o'$, secured to the screw-shaft $o$, so that the gears are alternately secured to the screw by means of the clutch as the screw is reciprocated forward and backward under the pressure of a swinging arm $p$, that is secured to the front end of the cart and is oscillated by the movement of a cam $p'$, mounted upon a rod $p^2$, supported transversely across the front end of the cart in suitable bearings. These screws $o$ each bear a threaded nut $o^2$, from which rise arms $o^3$, that are secured to a board $o^4$, that passes across the interior of the cart from arm to arm, so that when the nuts are fed down by the rotation of the screws the board pushes whatever is in front of it toward the spreading-drum. Upon the short shaft $e'$, that is parallel with the axle, is mounted a cam $q$, that is connected by a rod $q'$ with the end of an oscillating lever $q^2$, fulcrumed upon a vertical shaft $q^3$, supported by a bearing $q^4$, attached to the thills, shafts, or a part connected therewith. Upon each side of this lever $q^2$ are pivoted pawls $q^5\ q^6$, normally forced by springs to engage with the teeth of the pair of ratchet-wheels $q^7\ q^8$, secured to the vertical shaft $q^3$, to which also is secured a bevel-gear $r$, that meshes with a bevel-gear $r'$, attached to a spur-gear $r^2$ in mesh with a rack $r^3$, attached to the under side of the cart-body. (See Figs. 3, 6, 7, and 8.) The teeth of the ratchet-wheels $q^7\ q^8$ are cut so as to stand in opposite directions, and the pawls are normally held from engaging the ratchet by means of rods $q^9\ q^{10}$, secured to a lever $s$, pivoted to a part depending from the axle when the lever is in the central position of its oscillation up and down the guide $s'$, that is secured to the shafts or thills. The rods $q^9\ q^{10}$ are so shaped that when the lever $s$ is raised the pawl $q^6$ is allowed to engage the ratchet $q^8$ and drive the shaft and gears in a direction to raise the rack and tip the cart, and when the lever is at its lowest position the pawl $q^5$ is allowed to engage the ratchet $q^7$ and drive the shaft and gears to lower the rack and tip back the cart.

A rod $t$ leads from an arm $p^3$, projecting from the rod $p^2$ that bears the cams $p'$ through an eye attached to the shafts or neap, and is provided with an enlarged end that engages the eye and pulls the rod so as to rotate the cam when the cart is tipped to the desired inclination, and a rod $t'$ leads from an arm $p^4$, projecting from the same rod $p^2$ through an eye attached to the handle of the double oscillating catch $s^2$ that is pivoted to the guide $s'$ near its center. This rod $t'$ is provided with a nut, so located that when the cam is turned downward and the rod pulled up, when the cart is tipped up, the end of the rod engages the catch and releases the lever. The catch $s^3$, which is provided near the upper end of the guide to hold the lever $s$ raised, is connected with the cart by means of a chain $u$, of such length that when the body is tipped the catch is released, and a catch $s^4$, which is provided near the lower end of the guide to hold the lever $s$ down, is released by means of a rod $s^5$, pivoted to the shafts or neap when the rod is oscillated by the cart as it is lowered. A spring $s^6$, pivoted to the neap or shafts, is connected with the lever $s$, so as to normally hold the lever at its middle position when the cart is lowered.

When the lever $s$ is in its middle position, everything is thrown out of gear. In the starting the lever $s$ is disengaged from the catch $s^2$ and raised, so as to be held by the catch $s^3$. This throws the pawl $q^6$ into engagement with the ratchet $q^8$, and as the lever $q^2$ is oscillated by the movement of the cam $q$ the shaft $q^3$ is rotated, causing the gear $r^2$ to raise the rack and tip the cart until the chain $u$ is drawn taut, which releases the catch $s^3$, so that the lever drops to its middle position and is held by the catch $s^2$. As the cart is tipped up the clutches $h^3\ g'$ mesh, causing the reel and the connected gearing to rotate. At the same time the rod $t$ oscillates the cam $p'$, which throws the arm $p$ backward, giving the screw such a backward movement that the clutch $o'$ engages the clutch on the hub of the beveled gear $m^2$, and this so rotates the screw as to cause the push-board in the cart to move backward. When the manure is all fed to the reel by the board and the nuts $o^2$ come in contact with the backs of the gears $m^3$, the continued rotation causes the screw to slide forward and pull the clutch $o'$ from the clutch with which it has been in mesh to the clutch upon the forward gear, and the tension of the spring $v$ thrusts the screw still farther forward, until the clutch $o'$ engages with the clutch upon the hub of the bevel-gear $m^3$, causing the screw to rotate in the opposite direction and feed the push-board $o^4$ back to the other end of the cart. As the screw is pushed forward the arms $p$ throw the cam $p'$ downward, oscillating the rod, and as the arm $p^4$ moves upward its lower end engages the eye upon the handle of the catch $s^2$ and disengages the lever $s$, allowing it to drop to its lowest position. This movement of the lever so moves the rods $q^9\ q^{10}$ that the pawl $q^6$ is drawn from the ratchet $q^8$ and the pawl $q^5$ is thrown into engagement with the ratchet $q^7$, so that the gears rotate the pinion in the opposite direction, which lowers the rack and the forward end of the cart, which, when nearly down, comes in contact with the end of the rod $s^5$ and draws the catch $s^4$, so as to release the lever and allow it under the impulse of the spring $s^6$, that is made tense as the cart is lowered, to rise to its middle position, where it is held by the catch $s^2$ with all the parts out of gear and the cart ready to be again loaded.

I claim as my invention—

1. In combination with a dump-cart, a toothed drum located in the rear of the cart, pinions, gears, and shafts connecting the drum with a gear driven by the rotation of the wheels of the cart, and screws connected with the driving-gears bearing a feed-board which moves over the bottom of said cart, substantially as specified.

2. In combination with a dump-cart, a toothed drum located in the rear of the cart, pinions, gears, and shafts connecting the drum with a gear driven by the rotation of the wheels of the cart, a rack attached to the cart, and a pinion meshing with the rack and driven by the rotation of the wheels of the cart to tilt said cart, substantially as specified.

3. In combination with a dump-cart, the toothed drum located in the rear of the cart, pinions, gears, and shafts connecting the drum with a gear driven by the rotation of the wheels of the cart, screws connected with the driving-gears bearing a feed-board, a rack attached to the cart, and a pinion meshing with the rack and driven by the rotation of the wheels of the cart, substantially as specified.

4. In combination with a dump-cart, a toothed drum located in the rear of the cart, pinions, gears, and shafts connecting the drum with a gear driven by the rotation of the wheels of the cart, screws bearing a clutch and two loose gears connected with the driving-gears, a feed-board borne by the screws, a rack attached to the cart, and a pinion meshing with the rack and driven by the rotation of the wheels of the cart, substantially as specified.

5. In combination with a dump-cart, a toothed drum located in the rear of the cart, pinions, gears, and shafts connecting the drum with a gear driven by the rotation of the wheels of the cart, screws connected with the driving-gears bearing a feed-board, a rack attached to the cart, a pinion in mesh with the rack, a pair of ratchet-wheels connected with the pinion, pawls oscillated by the rotation of the wheels of the cart, adapted to be engaged with the ratchet-wheels, and a lever bearing rods adapted to engage the pawls, substantially as specified.

6. In combination with a dump-cart, a toothed drum located in the rear of the cart, pinions, gears, and shafts connecting the drum with a gear driven by the rotation of the wheels of the cart, screws bearing a clutch and two loose gears connected with the driving-gears, a feed-board borne by the screws, a rack attached to the cart, a pinion meshing with the rack, a lever bearing a pair of ratchet-wheels connected with the pinion, pawls oscillated by the rotation of the wheels of the cart, adapted to be engaged with the ratchet-wheels, a lever bearing rods adapted to engage the pawls, and a frame bearing automatically-operated catches adapted to hold the lever in different positions, substantially as specified.

GEORGE E. SPARKS.

Witnesses:
J. EVERETT ALDEN,
E. HORATIO TALCOTT.